(12) United States Patent
Carson

(10) Patent No.: US 7,333,934 B1
(45) Date of Patent: Feb. 19, 2008

(54) PRE-PROCESSING INDIVIDUAL AUDIO ITEMS IN A MEDIA PROJECT IN ORDER TO IMPROVE REAL-TIME PROCESSING OF THE MEDIA PROJECT

(75) Inventor: Kenneth M. Carson, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 811 days.

(21) Appl. No.: 10/666,467

(22) Filed: Sep. 19, 2003

Related U.S. Application Data

(60) Provisional application No. 60/505,347, filed on Apr. 6, 2003.

(51) Int. Cl.
*G10L 19/00* (2006.01)
(52) U.S. Cl. .......................................... 704/500; 700/94
(58) Field of Classification Search ................ 704/500; 700/94

See application file for complete search history.

(56) References Cited

U.S. PATENT DOCUMENTS

| | | | |
|---|---|---|---|
| 6,714,826 B1* | 3/2004 | Curley et al. .................. | 700/94 |
| 6,816,833 B1* | 11/2004 | Iwamoto et al. ............. | 704/207 |
| 2003/0171935 A1* | 9/2003 | Kawamura et al. ......... | 704/500 |

* cited by examiner

*Primary Examiner*—Daniel Abebe
(74) *Attorney, Agent, or Firm*—Adeli & Tollen LLP

(57) ABSTRACT

Some embodiments of the invention provide a method of processing audio data while creating a media presentation. The media presentation includes several audio streams. The method processes a section of a first audio stream and stores the processed section of the first audio stream. The method also processes a section of a second audio stream that overlaps with the processed section of the first audio stream. The method then processes the section of the second audio stream independently of the first audio stream. In some embodiments, the method processes the first audio stream section by applying an effect to the first audio stream section. Also, in some embodiments, the processing of the first audio stream section also entails performing a sample rate conversion on the first audio stream section.

47 Claims, 13 Drawing Sheets

PRE-PROCESSING INDIVIDUAL AUDIO ITEMS IN A MEDIA PROJECT IN ORDER TO IMPROVE REAL-TIME PROCESSING OF THE MEDIA PROJECT

CLAIM OF BENEFIT

This application claims the benefit of U.S. Provisional Application having the Ser. No. 60/505,347, entitled "Method and Apparatus for Pre-Processing Audio Items in a Media Project in order to Improve Real-Time Processing of the Media Project", filed on Apr. 6, 2003. This application is incorporated herein by reference.

FIELD OF THE INVENTION

The present invention is directed towards pre-processing individual audio items in a media project in order to improve real-time processing of the media project.

BACKGROUND OF THE INVENTION

There are numerous multi-media editing applications today for editing and creating multimedia presentations. Examples of such applications include Final Cut Pro® and iMovie®, both sold by Apple Computer, Inc. Multi-media editing applications allow a user to prepare a multi-media presentation by combining several video clips and audio items. They often allow the user to combine video and audio effects with imported video clips and audio items in order to enhance the multi-media presentation.

These applications often provide the user with several digital signal processing ("DSP") operations. The user can then select a DSP operation to apply an audio effect to an audio item that the user designates. These applications also provide DSP operations for adjusting the sample rate of an audio item. In this document, DSP operations and DSP's that apply an audio effect to an audio item are called filter operations and filters, while DSP operations and DSP's that adjust the sample rate of an audio item are called sample rate conversion ("SRC") operations and sample rate converters. Media editing application at times also provide the user with a mixer that allows the user to specify the volume level and pan (where pan is the audio distribution among different channels) of the audio items.

In media editing applications, it is often desirable to allow the user to process the composed media in real time, since real-time processing allow a user to instantaneously gauge the effect that can be achieved by adjusting certain parameters, and hence is an important part of the creative process. However, real-time processing often becomes more difficult as the user adds more content and specifies more DSP and mixing operations. Often, real-time processing is impossible once the user adds a few tracks and operations, since audio and video processing is quite intensive, and this processing becomes more intensive as DSP and mixing operations are added.

Therefore, there is a need to reduce real-time transactions in order to allow the user to have some real-time processing capabilities. FIG. 1 illustrates one prior art way for reducing the number of real-time transactions. The approach shown in this figure is called sequence level rendering. This figure illustrates the processing 115 of several audio tracks 1 to N. This processing entails retrieving audio data from a source file, performing any necessary sample rate conversion, and applying any necessary filter operations. After this processing for each track, a mixer 105 combines the processed data of all the tracks and assigns the combined data to different audio channels (e.g., left and right for a stereo presentation) while accounting for the appropriate volume and pan values specified through the mixer. The output of the mixer is then played through the speakers 110.

As illustrated in FIG. 1, sequence level rendering is a preprocess operation that composites the processing of all the tracks and the mixing into one render file 120. By pre-processing all the operations and mixing of the audio tracks, this operation frees up the CPU from having to do these operations in real-time. Hence, the thought behind this approach is to have the user create one render file once the user is satisfied with the settings and arrangement of certain audio items.

However, this approach has several disadvantages. First, the user cannot modify the DSP operations previously specified for a track without discarding the rendering file and re-rendering the tracks 1 to N. Such re-rendering is time consuming, defeats the purpose of preprocessing, and detracts from the creative process. Second, the rendering file produced through sequence level rendering has to be discarded when the user wants to move one of the tracks 1 to N.

Third, the rendering file 120 has to be discarded even when the user moves all of the pre-processed tracks in unison. This is because video and audio data rates are not integer multiples of each other, which requires the audio samples per frame to be uniquely specified based on the position of the frame in the presentation and with respect to the audio data's source file. Sequence level rendering cannot address the issue of the sample count being specifically tailored for the position of the frame in the presentation. Therefore, there is a need in the art for method for pre-processing individual audio items in a media project in order to improve real-time processing of the media project.

SUMMARY OF THE INVENTION

Some embodiments of the invention provide a method of processing audio data while creating a media presentation. The media presentation includes several audio streams. The method processes a section of a first audio stream and stores the processed section of the first audio stream. The method also processes a section of a second audio stream that overlaps with the processed section of the first audio stream. The method then processes the section of the second audio stream independently of the first audio stream. In some embodiments, the method processes the first audio stream section by applying an effect to the first audio stream section. Also, in some embodiments, the processing of the first audio stream section also entails performing a sample rate conversion on the first audio stream section.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
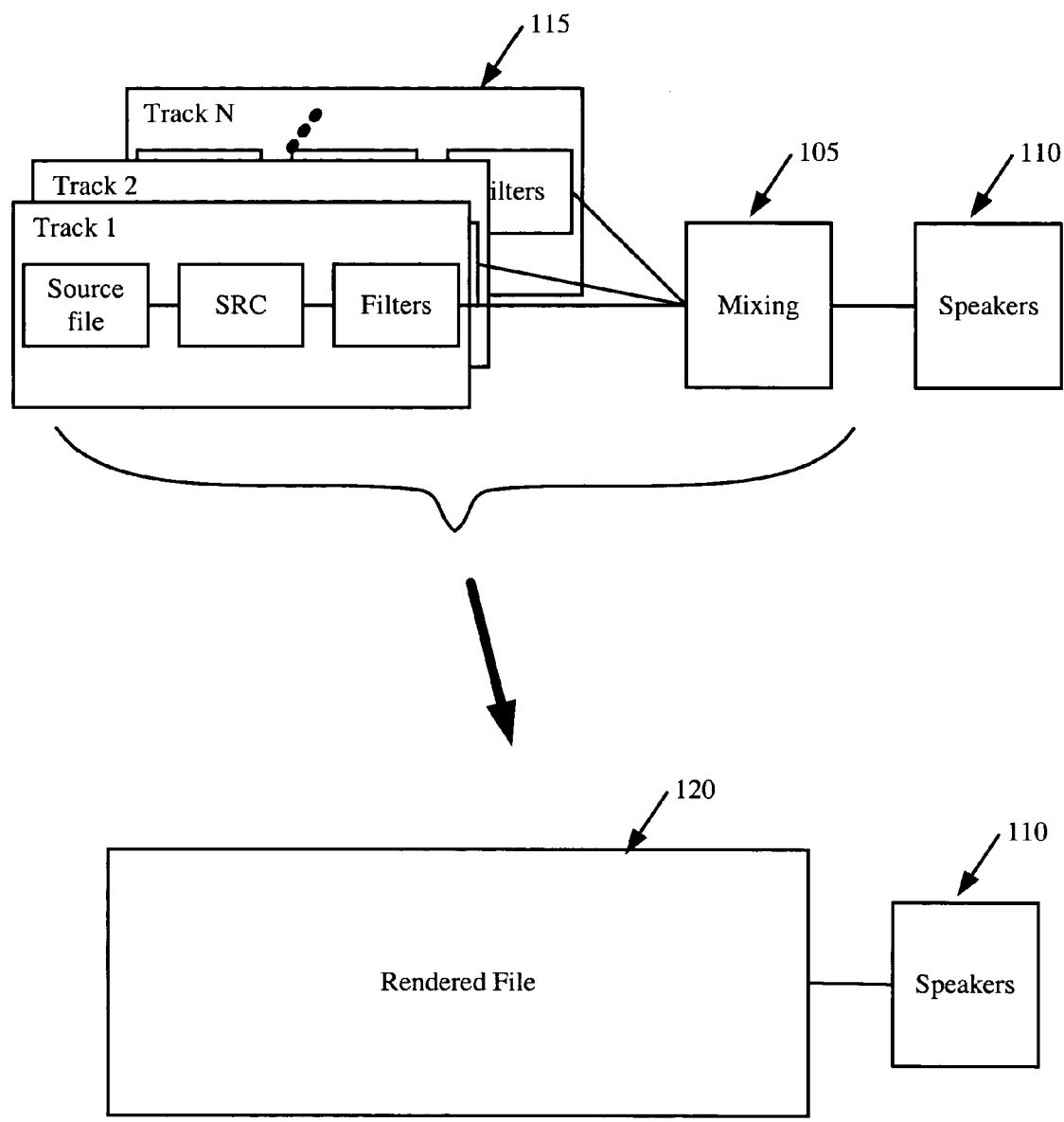
FIG. 1 illustrates one prior art way for reducing the number of real-time transactions.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention are audio-editing applications that pre-process individual audio items in a media project in order to reduce the load of their computer system during real-time processing of the media project. This pre-processing is referred to as item level rendering to distinguish it from sequence level rendering, which is not done on an individual item basis. In some embodiments, the pre-processing (i.e., the item level rendering) can only involve filter and sample rate conversion operations. In other words, the pre-processing never involves the mixing operations. This approach gives the user of the application more flexibility to perform real-time mixing of different audio tracks.

FIGS. 2-8 present one example that illustrates the operation of some embodiments of the invention. Each of these figures presents a graphical user interface ("GUI") of a media-editing application that employs the invention. The GUI images in these figures illustrate a succession of operations that are performed on several audio items.

The GUI has several windows open in each of these figures. Three of these windows are a time bar window 205, a display window 210, and an audio mixer 215. Each of these three windows is identified by its reference numbers in FIG. 2. The time bar window 205 graphically represents video clips and audio bars in terms of bars that span across a horizontal axis that specifies time. For instance, in FIG. 2, the time bar window 205 includes a video bar 220 that represents a video clip entitled DVI.mov, and four pairs of related audio bars 225, 230, 235, and 240 that represent four audio items entitled DVI.mov, Extreme Music, Audio2.mov, and Audio1.mov. The audio item DVI.mov is an audio item associated with the video clip DVI.mov. The other audio items have been added to the project separately from the video clip in this case.

An audio item in this example is a segment of audio from an audio source, and each audio item is assigned to an audio track 242, 244, 246. Also, in the examples illustrated in FIGS. 2-8, each audio item is represented by a related pair of audio bars (e.g., bars 230a and 230b for the audio item Extreme Music), as each track is to be presented in a stereo format. Specifically, for each audio item (e.g., the audio item Extreme Music), one of the related pair of audio bars (e.g., 230a) is for the left speaker, and the other bar (e.g., 230b) is for the right speaker. In the example illustrated in FIG. 2, three of the audio items DVI.mov, Extreme Music, and Audio2.mov overlap. Audio items DVI.mov and Extreme Music completely overlap, and extend past audio item Audio2.mov. Also, the audio item Audio1.mov begins when audio items DVI.mov and Extreme Music finish.

Figure 2:
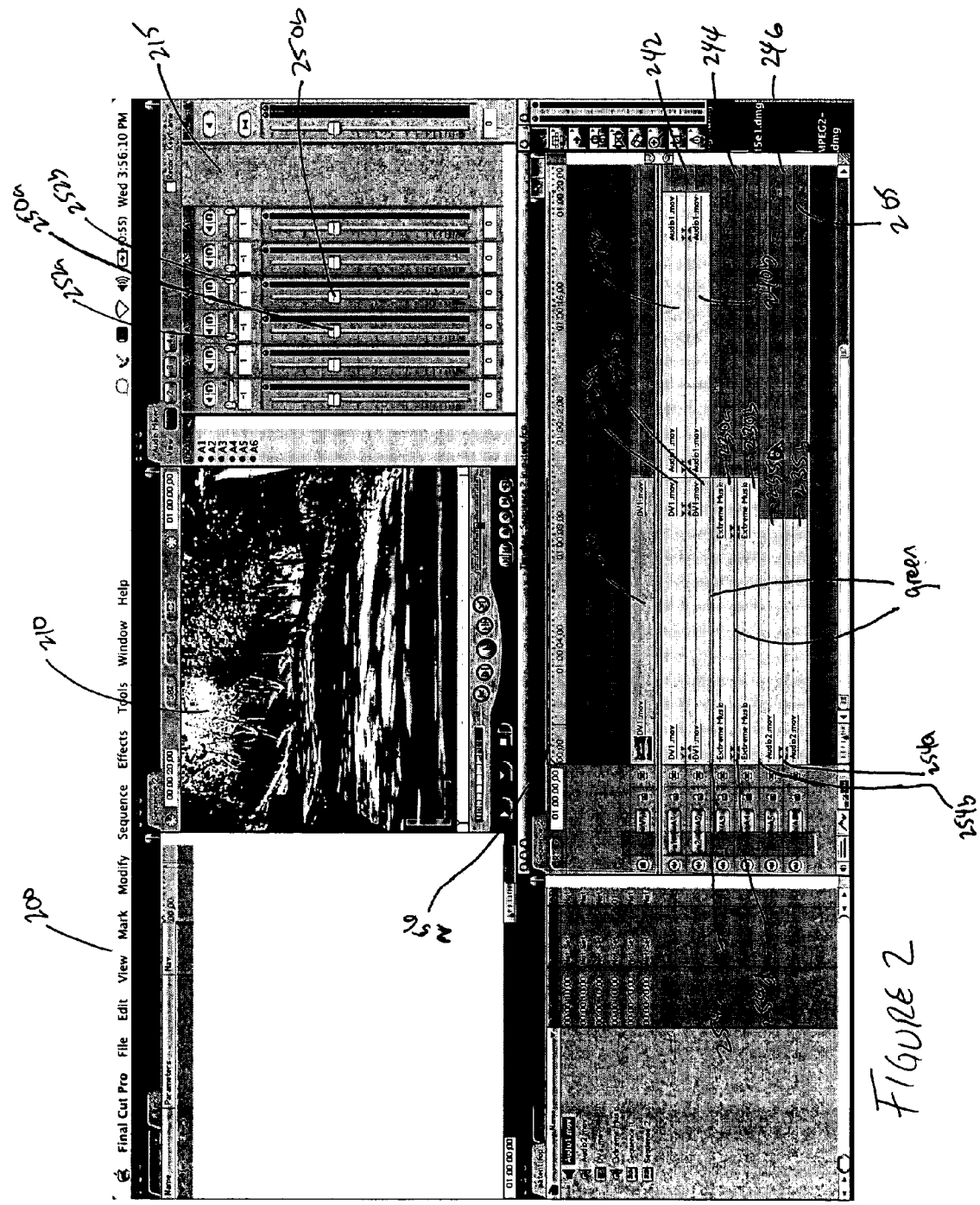
FIGS. 2-8 illustrate one sequence of operations in some embodiments of the invention.

The display window 210 displays at any moment the video content that the user has specified for that instant. As illustrated in FIG. 2, the audio mixer 215 specifies one volume control knob for each channel of a track (e.g., knob 250a for the left channel of track 244 and knob 250b for the right channel of track 244). Each knob slides across a scale that defines different volume levels. Also, above each volume control knob and its scale there is a pan control knob (e.g., pan control knob 252a is above volume control knob 250a). The pan control knob slides across the scale that on one end represents the left speaker and at the other end represents the right speaker. FIG. 2 illustrates the default values of the volume control and pan control knobs.

FIG. 2 also illustrates couple of features in the GUI 200 that pertain to the item level rendering. One such item is the item-level-render bar 252 that appears above each one of the audio item bars. Some embodiments use this bar to specify whether an audio item has been pre-processed, and if so, what portion of the audio item has been pre-processed. As further described below, the item-level-render bar changes to a first color (e.g., changes to dark gray from white or from green) for the portion of the audio item that has been pre-processed. Also, the item-level-render bar changes to a second color (e.g., changes to green from white) when a sample rate conversion has been specified for an audio item. In FIG. 2, the item-level bar 254c and 254d above the audio-item bars 230a and 230b are shown in the second color (e.g., green) to specify that a sample rate conversion has been specified for the audio item Extreme Music. In this example, the Extreme Music audio item is from a CD that has a 44K sampling rate, which does not match the DV medias 48K audio sampling rate.

FIG. 2 also illustrates a render status bar 256 above the time bar window 205. Each time the user makes a modification in the time bar window 205, the media-editing application determines whether at any segment of the time bar (i.e., at any interval in the presentation) the filter and SRC operations specified for the audio items require more processing power than the computer system can provide in real-time. If the application identifies any such segment, the application turns to red each portion of the render status bar 256 that overlaps an identified segment. In this manner, the render status bar alerts the user when the specified operations have likely exceeded the real-time processing power of the computer system, and identifies portions of the presentation where this excess has occurred. The render status bar 256 will be further described below.

Figure 3:
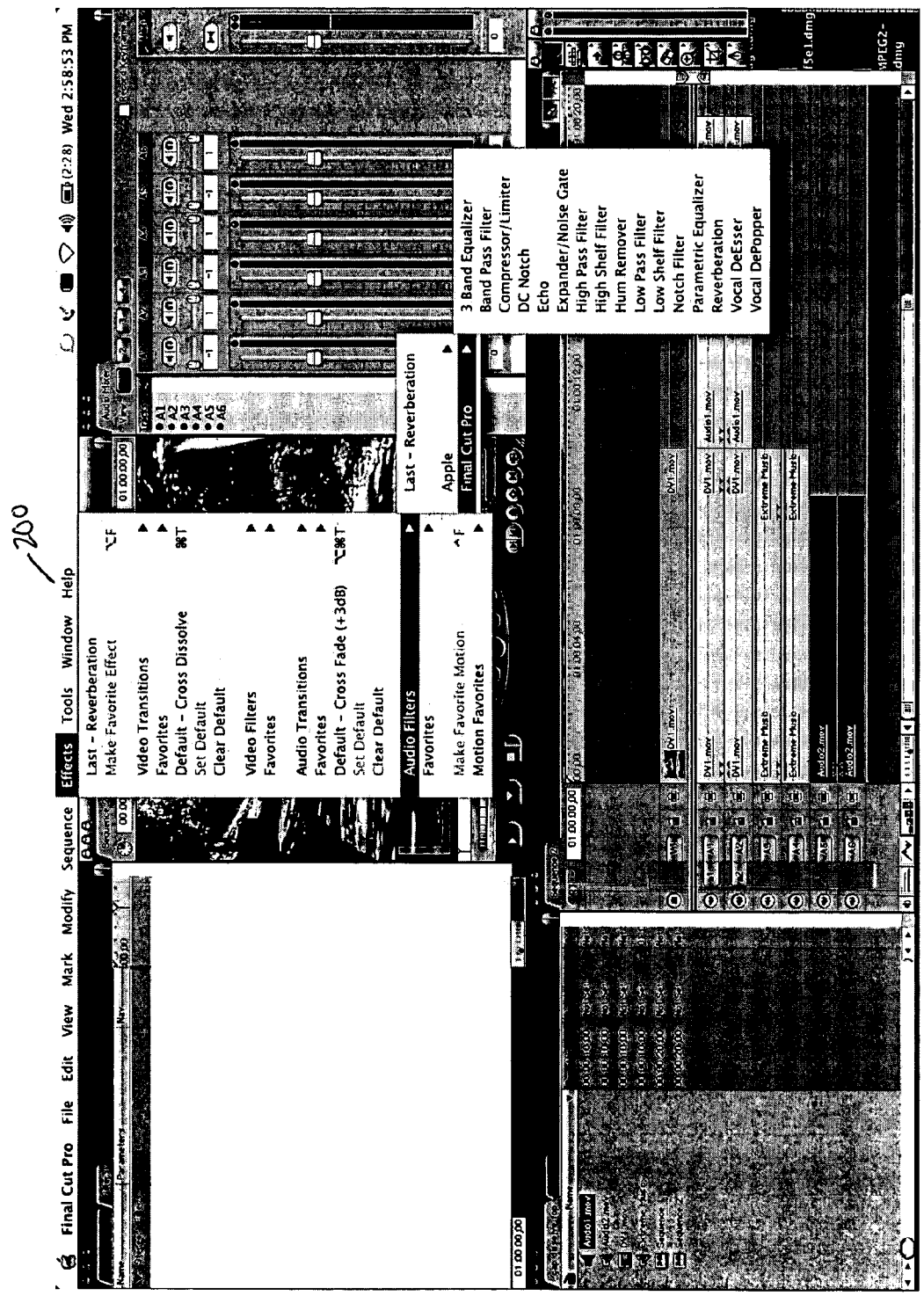

As mentioned above, a user can specify a variety of filter operations on an audio item. FIG. 3 illustrates that GUI 200 allows a user to specify a filter operation for an audio item by selecting an audio item (in this case, by clicking on the audio item Audio2.mov) and then selecting an audio filter in the effects menu selection. This figure illustrates numerous filter operations, such as 3 Band Equalizer, Band Pass Filter, Compressor/Limiter, DC Notch, etc.

Figure 4:
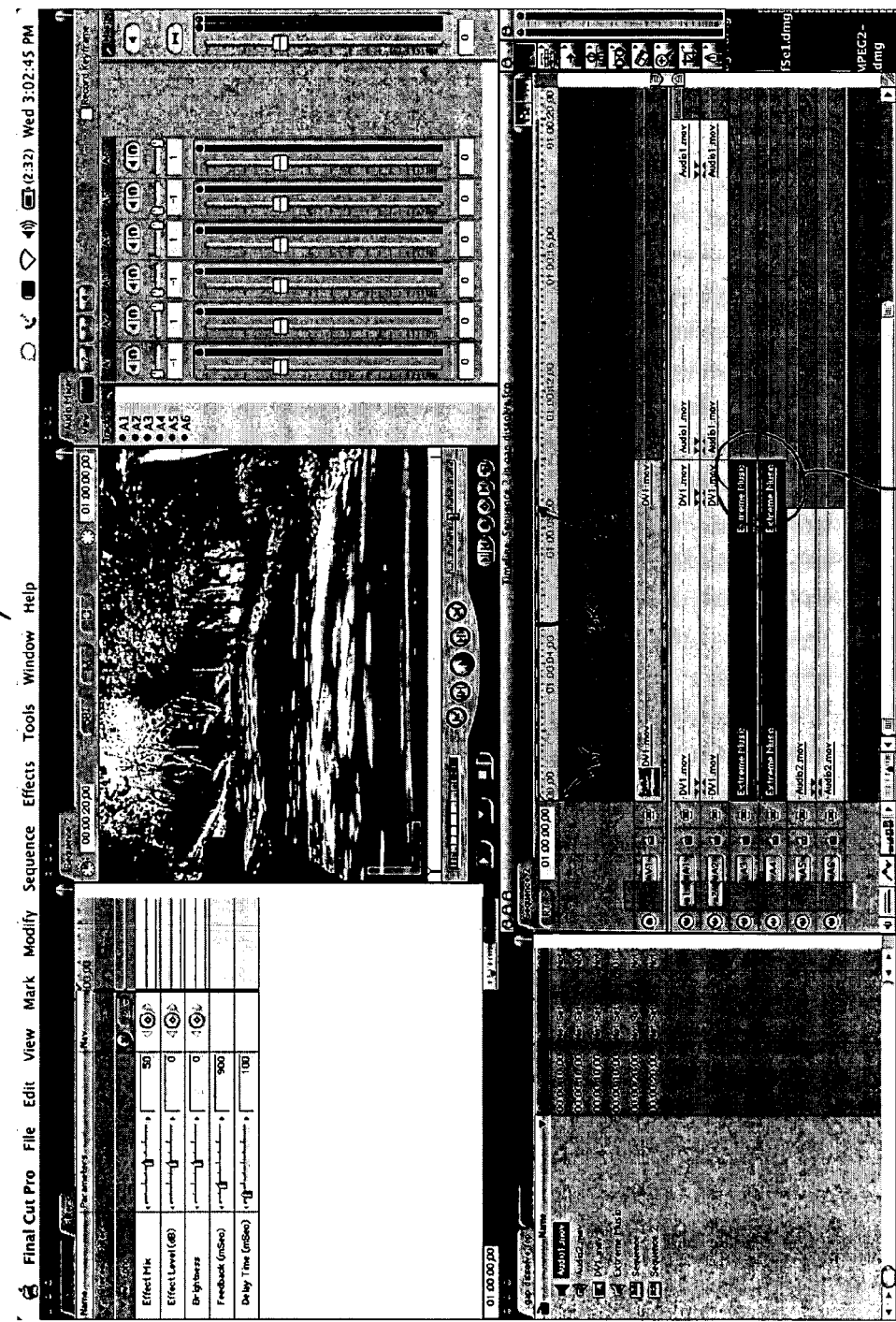

FIG. 4 illustrates the GUI 200 after the user has specified filtering operations for the audio items Audio2.mov and Extreme Music. At this stage, the render status bar 256 is red from position 405 to position 410. This color specifies that the portion of the presentation that is the segment 415 (which is between points 405 and 410) cannot probably be rendered in real-time. This is because the processing power of the computer system is less than the processing resources needed for the filtering operations that are specified for the audio items Audio2.mov and Extreme Music, which overlap in the segment 415. The audio item Audio2.mov completely falls within the segment 415. On the other hand, a portion 420 of the audio item Extreme Music does not overlap with this segment. The red color in the render status bar does not extend over this portion 420 of the audio item Extreme Music, as this portion does not overlap the audio item Audio2.mov and hence does not require processing resources in excess of what the computer system can offer.

Figure 5:
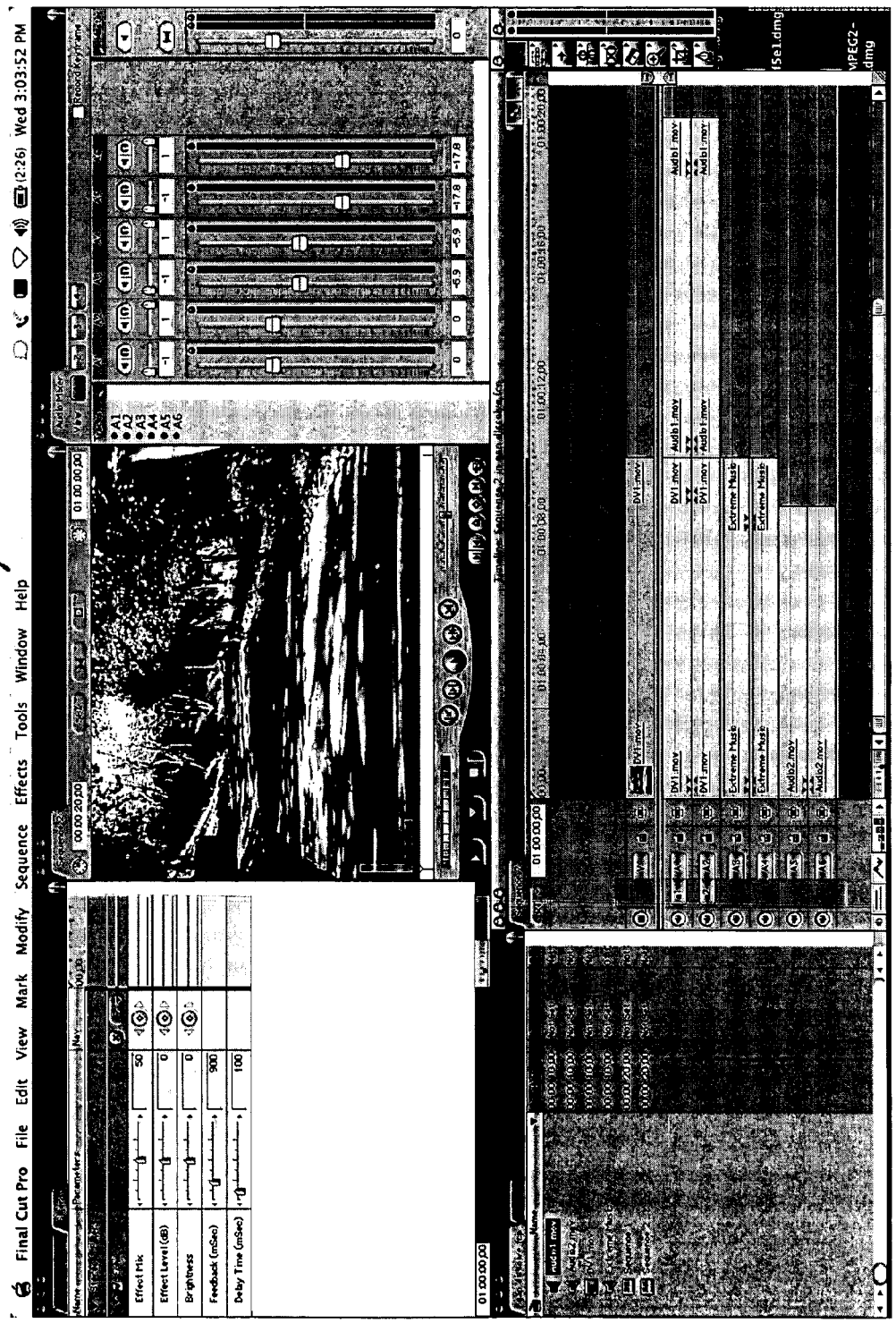

In the sequence of operations illustrated in FIGS. 2-8, the user next adjusts the volume control knobs of the mixer 215. FIG. 5 illustrates these adjustments. In some embodiments, the adjusting of the mixer parameters does not affect the media-editing application's assessment as to whether the resources of the computer system can handle the specified operations. In other words, the application does not cost mixer parameter adjustments in some application, to assess the processing capacity at each segment. Accordingly, the red portion 415 of the render status bar 256 is the same in FIGS. 4 and 5, even though in FIG. 5 the user has modified the mixer parameters.

Figure 6:
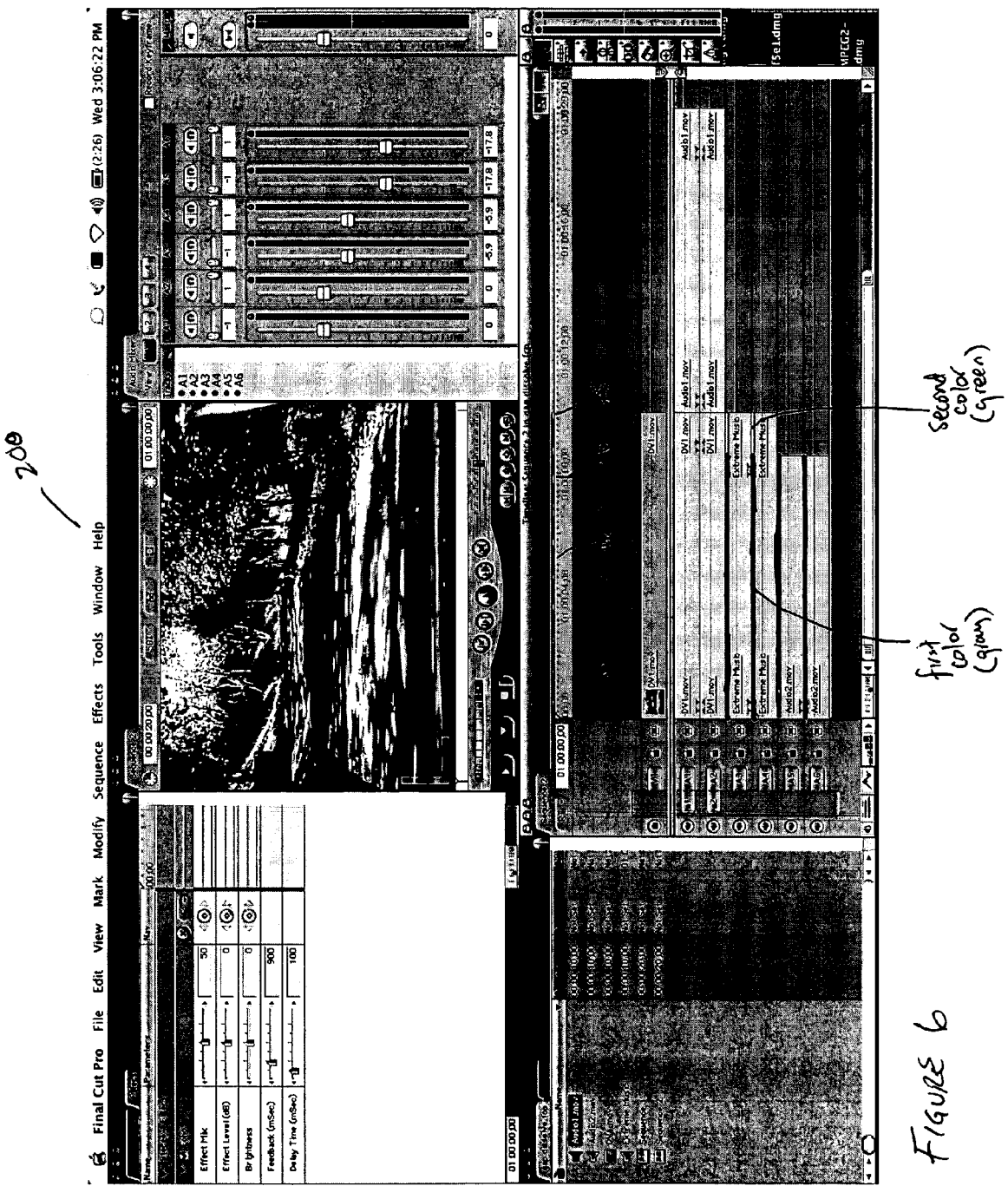

In the sequence of operations illustrated in FIGS. 2-8, the user next directs the application to generate render files for the portions of the audio items that fall in the red zone illustrated in FIG. 5. FIG. 6 illustrates the GUI 200 after this operation. As shown in FIG. 6, the status render bar 256 is no longer red for any segment because, at this stage, there is no segment of the presentation where the specified filter and SRC operations require more processing power than available. Also, at this stage, the portions of the item-level-render bars 254a-254d (of audio items Audio2.mov and Extreme Music) that overlapped segment 415 have changed their color from white to a dark gray. This change of color specifies that item-level render files have been created for these portions of the audio items Audio2.mov and Extreme Music.

As mentioned above, the entire audio item Audio2.mov overlapped with the segment 415, while a portion 420 of the Extreme Music item did not. Hence, a render file is specified for the entire audio item Audio2.mov, while a render file is specified for all of the Extreme Music item except for the portion 420.

Figure 9:
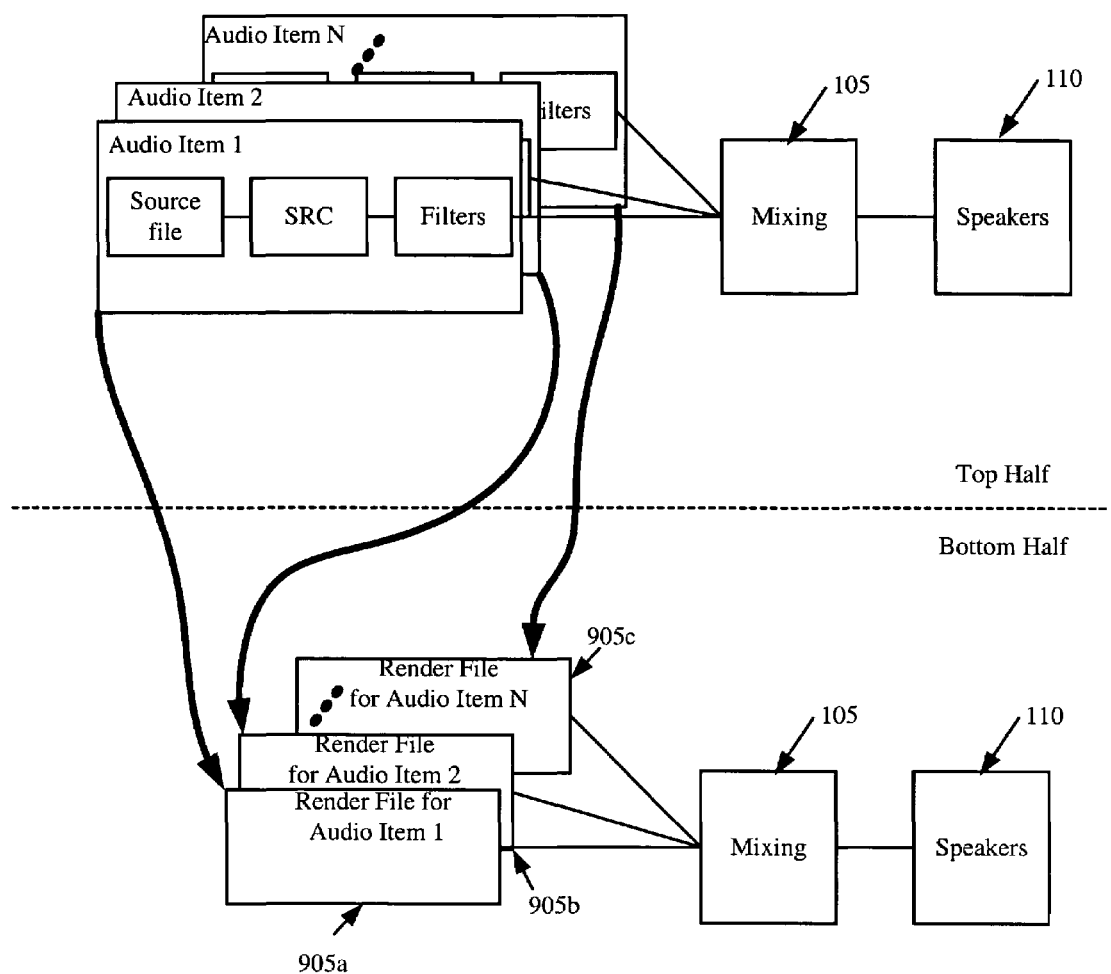
FIGS. 9 and 10 present block diagrams that conceptually illustrate item level rendering.
Figure 10:
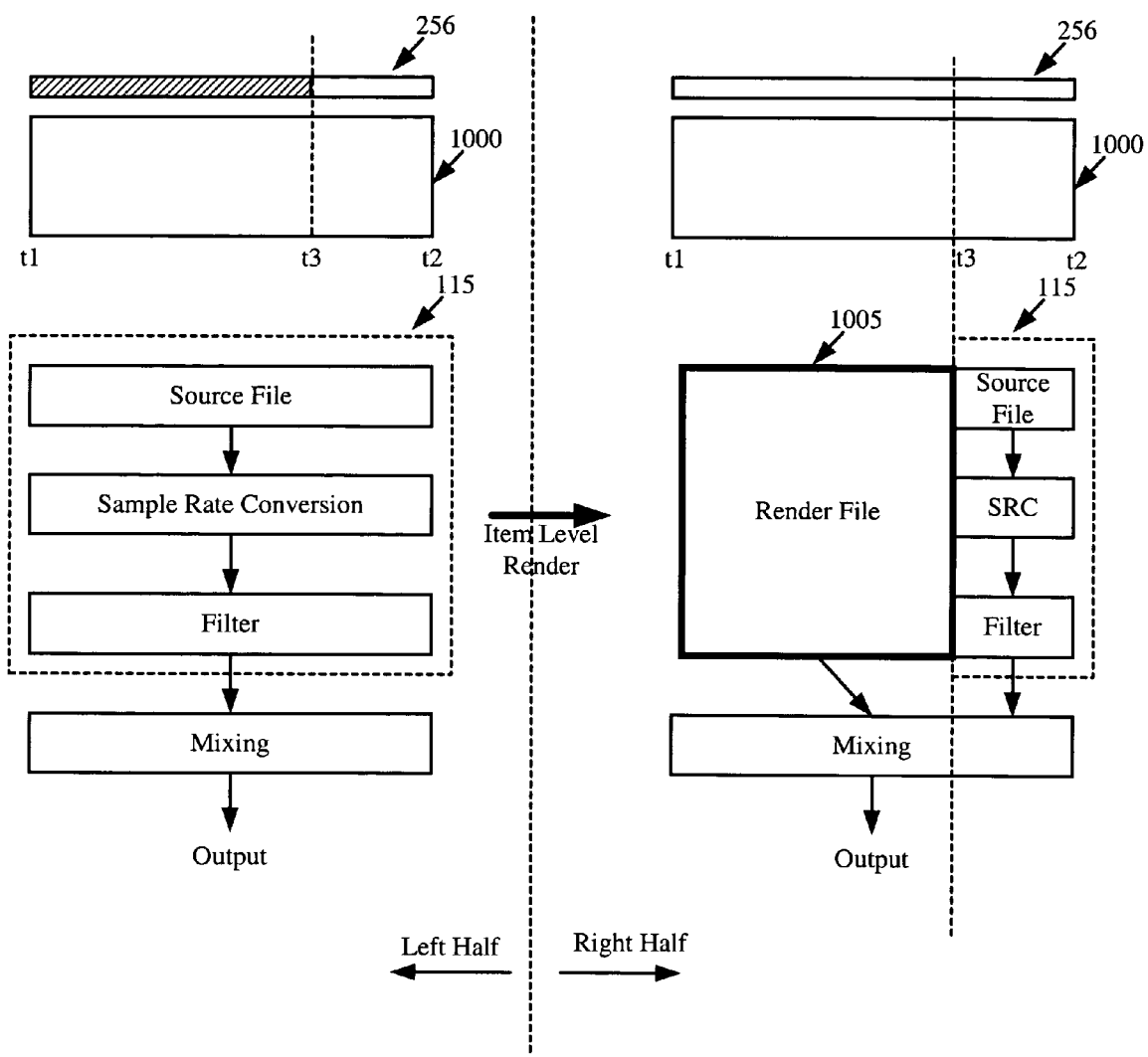

FIGS. 9 and 10 present examples that further illustrate generating a render file and generating such a file for only a portion of an audio item. FIG. 9 illustrates in its top half processing pipelines 115 for several audio items 1 to N. Each processing pipeline involves retrieving audio data from a source file, performing any necessary sample rate conversion, and applying any necessary filter operations. After this processing for each audio item, a mixer 105 is to combine the processed data of all the items and assigns the combined data to different audio channels (e.g., left and right for a stereo presentation) while accounting for the appropriate volume and pan values specified through the mixer. The output of the mixer is then played through the speakers 110.

The bottom half of FIG. 9 illustrates what happens when each of the items 1 to N is item level rendered individually and separately from the other audio items. This rendering generates one render file 905 for each audio item rendered. Each particular audio item's rendered file contains processed audio data that was obtained by (1) retrieving the audio data for the particular audio item from this unit's source file and (2) applying to the retrieved data all the filter and SRC operations that were specified for the particular audio item. As shown in FIG. 9, the data in the rendered files 905 can be supplied to the mixer 105 for mixing. In this manner, the rendered files serve as new defacto source files for the audio items, and eliminate the need to traverse through the processing pipeline 115 in real-time, which, in turn, frees up computation resources for other operations. However, it should be noted that in some embodiments the render files are discarded when new filter or SRC operations are specified for a previously rendered audio item.

FIG. 10 presents an example that illustrates producing a render file for only a portion of an audio item. The left half of this figure illustrates an audio item 1000 and a render status bar 256. It also illustrates that the pipeline processing 115 has to be performed for the entire interval that starts at t1 and ends at t2. The render status bar 256 is red (as indicated by the dash lines) from times t1 to t3, which specifies that in this interval from t1 to t3 the processing power of the computer system has been exceed by the operations specified for the audio item 1000 and other audio items overlapping this item.

The right half of FIG. 10 illustrates the state of the audio item 1000 after the user directs the media-editing application to item-level render this item. As shown in this half, the render status bar 256 is no longer red (as indicated by the absence of the dash lines). Also, in this half, a render file 1005 has replaced the processing pipeline in the interval from time t1 to t3. However, this pipeline 115 still exists in the interval from times t3 to t2.

In FIG. 6, an example of such a partial rendering (i.e., an example of generating a render file for only a portion of an audio item) is the rendering of the Extreme Music audio item. The item-level bar 254c and 254d above this item's bars 230a and 230b are a first color (e.g., dark gray) between 405 and 410, but they are a second color (e.g., green) between 410 and 605, which is the end of this audio item. The first color specifies that an item-level render file has been created for the audio item Extreme Music for the interval between 405 and 410. The second color specifies that no render file have been created for this item for the interval between 410 and 605. In the interval between 410 and 605, the media-editing application will still use a processing pipeline to process the audio data in real-time. Some embodiments generate one render file for all channels (e.g., the left and right channels) of the audio item, while other embodiments generate one render file for each channel.

Figure 7:
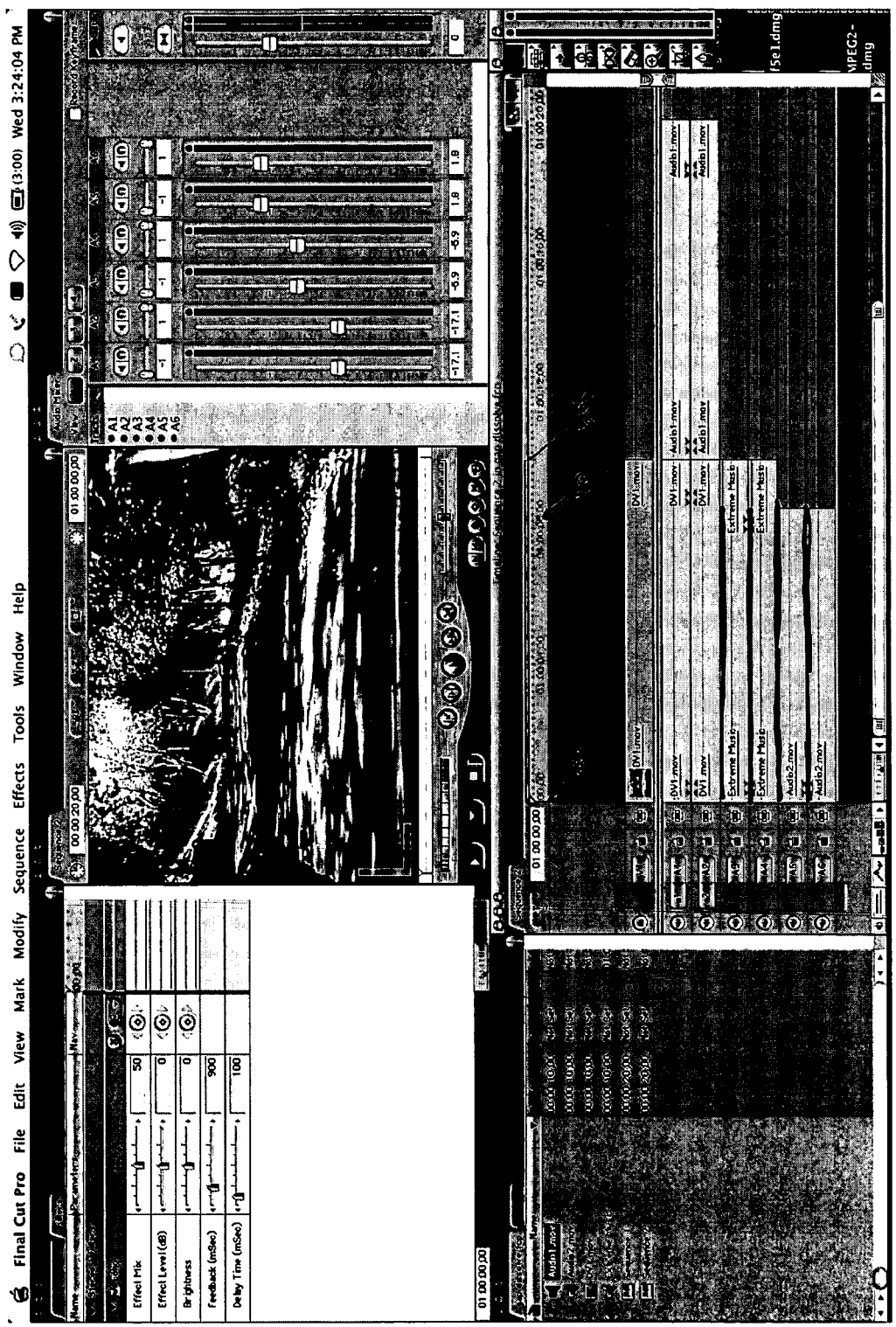

FIG. 7 illustrates one advantage of item level rendering. This figure illustrates that, after the rendering operation of FIG. 6, the mixer parameters (which in this example are the volume levels) can be adjusted. This would not be possible with sequence level rendering as this type of rendering subsumes the mixing in it.

Figure 8:
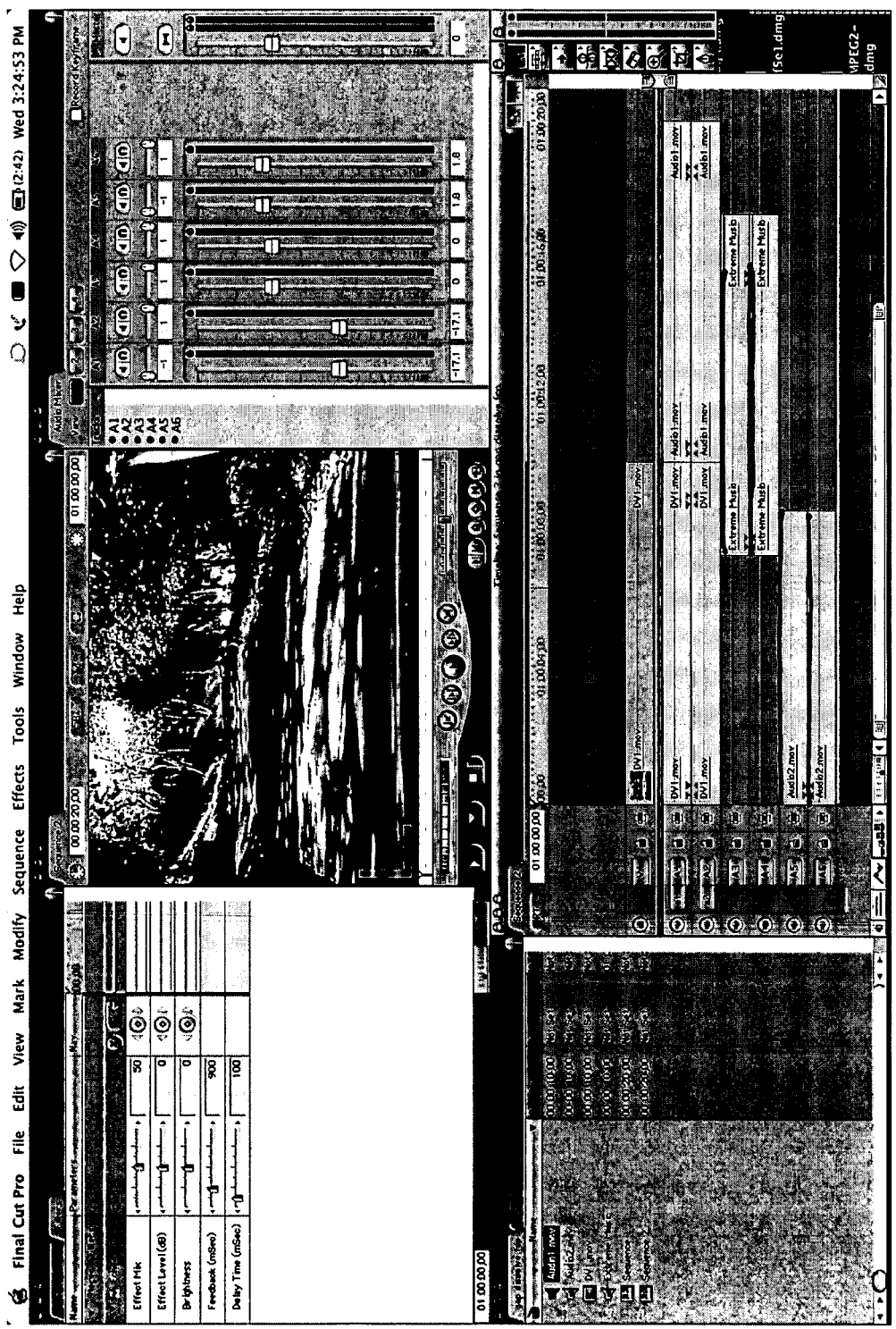

FIG. 8 illustrates another advantage of item level rendering. This figure illustrates that, after the rendering operation of FIG. 6 and volume adjustments of FIG. 7, the rendered audio item (in this case, the Extreme Music item) can be dragged across the timeline. Such movement does not create any problems because item level rendering can account for the fact that audio and video rates are not integer multiples of each other. Item level rendering accounts for this by first always rendering a few extra samples (i.e., rendering long). Second, by rendering each audio item individually, item level rendering allows the media editing application to correctly tailor the number of samples in each audio section to the position of the corresponding video frame in the presentation and to the audio data's source file.

Figure 11:
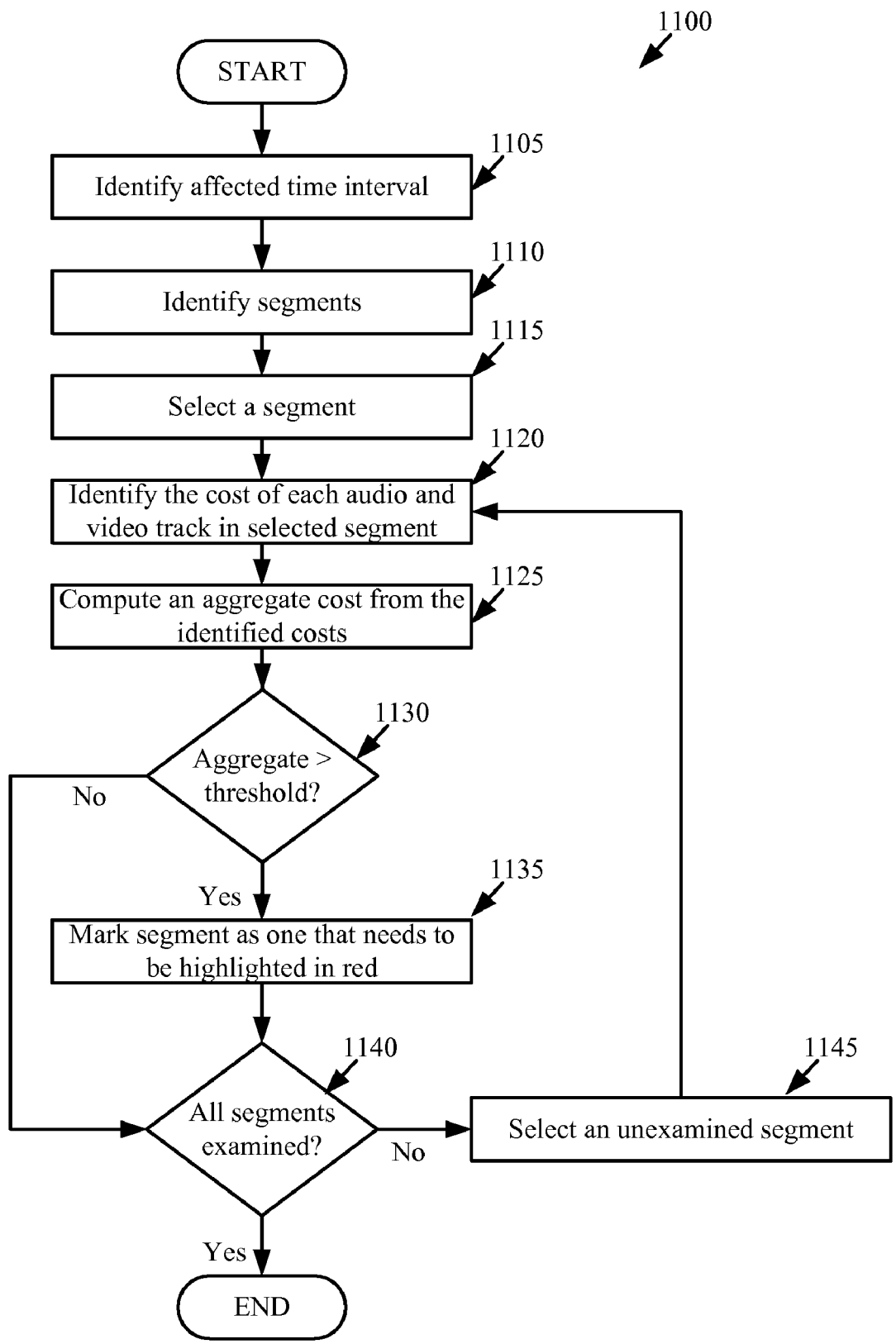
FIG. 11 illustrates a process performed by some embodiments each time a project changes.

FIG. 11 illustrates a process 1100 that the media-editing application performs each time there is a change in the presentation. For instance, this process is performed whenever an audio or video item is added or changed (e.g., moved, assigned new filter operations, etc.) to the presentation. As shown in FIG. 11, the process 1100 initially identifies (at 1105) the time interval affected by the change. It then identifies (at 1110) segments in the identified time interval. A segment is a section of the identified time interval where there is no change in the media presentation, i.e., where all the audio or video components (the video clips, the audio items, the filters, SRC's, etc) and the arrangement of these components remain the same. So, in the example illustrated in FIG. 4, one segment is the interval 415 since the parameters at any point in this interval are identical to the parameters at any other point in this interval. This segment 415 ends at 410 because after 410 the audio item Audio2.mov finishes (i.e., one of the parameters drops out).

After segmenting the affected time interval, the process selects (at 1115) one of the identified segments. It then identifies the cost of each audio item and video clip in the selected segment. For each audio item, the process computes a cost by identifying its filters and SRC's, and summing the cost of its identified filters and SRC's. The cost of filters and SRC's can be pre-tabulated or they can be generated based on the settings of their parameters. Each video clip can be costed by expressing the complexity of processing some of its attributes in terms of audio processing operations, such as filtering, SRC, and/or mixing.

Next, the process sums (at 1125) the costs identified at 1120. It then determines (at 1130) whether the aggregate is greater than a threshold that quantifies the system resources. Some embodiments allow a user to specify the threshold in terms of one of the audio processing parameter (e.g., specify that the threshold equals 8 tracks of mixing). Other embodiments compute this threshold based on the hardware resources of the computer system.

If not, the process transitions to 1140, which will be described below. Otherwise, the process transitions to 1135, where it marks the selected segment as one that needs to be presented in red in the GUI. From 1135, the process transitions to 1140. At 1140, the process determines whether all the identified segments were examined. If not, the process selects (at 1145) an unexamined segment that it identified at 1110. From 1145, the process transitions back to 1120, which was described. Once the process determines (at 1140) that it has examined all the identified segments, it ends.

Figure 12:
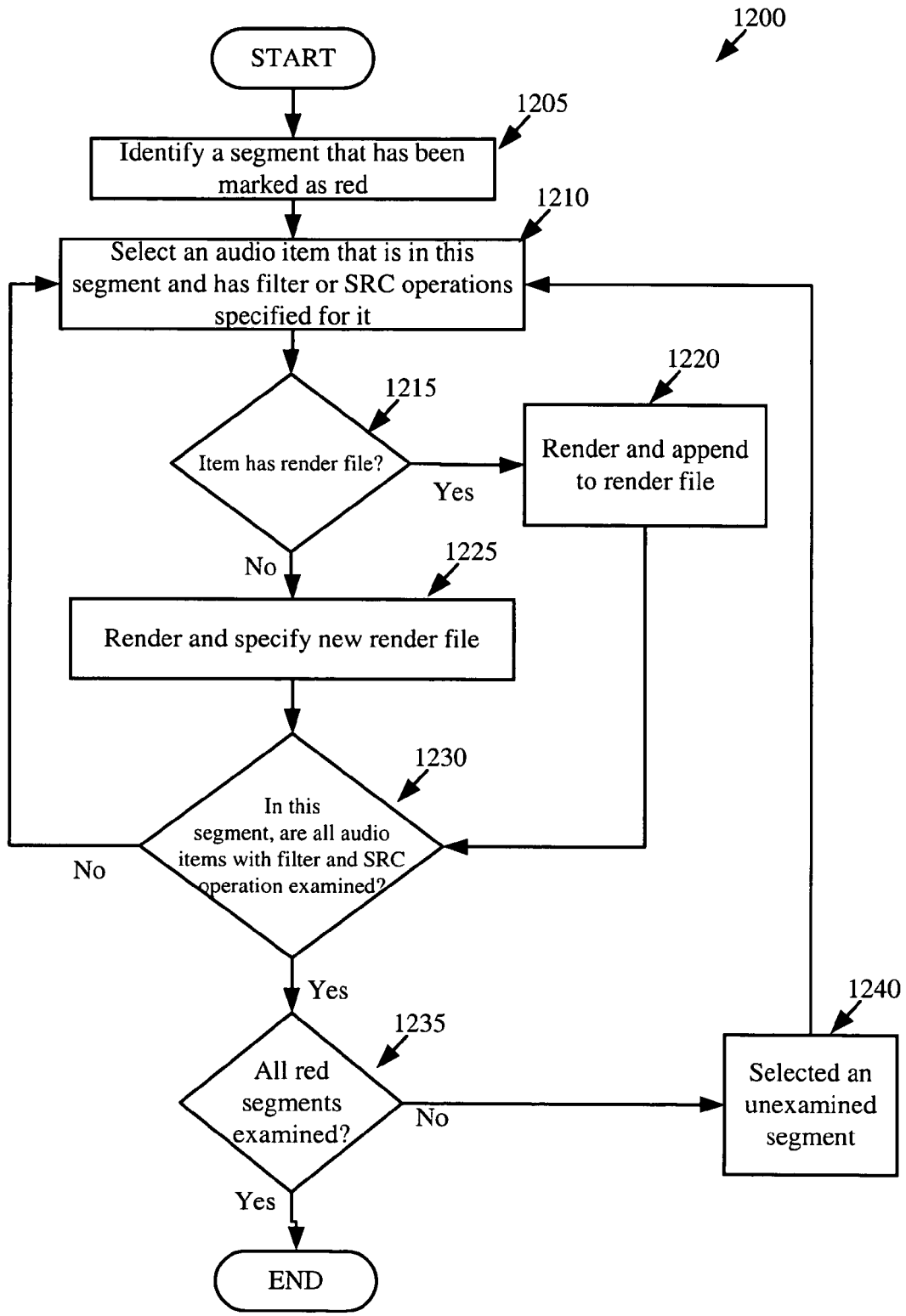
FIG. 12 illustrates a process for perform pre-processing in some embodiments.

FIG. 12 illustrates a process 1200 that the media editing application performs in some embodiments to item level render certain audio items. A user can direct the application to initiate such a process. Even when directed to perform item level rendering, the application in some embodiments decides to sequence level render the data if it determines that even after the requested item level rendering there would be segments that could not be processed in real-time.

To start item level rendering, the process 1200 identifies (at 1205) a segment that has been marked as red by the process 1100. It then selects (at 1210) an audio item that is in this segment and that has filter or SRC operations specified for it. It should be noted that some embodiments discard a previously defined render file when filter or SRC operations are specified for a portion of an audio item that has a previously defined render file.

At 1215, the process determines whether the selected audio item has a previously specified render file. If so, the process renders (at 1220) all the data within the selected segment and between the selected segment and the boundary of the previously defined render file, and then appends the previously defined render file to include the newly rendered data. For example, in the example illustrated in FIG. 10, the interval from t3 to t2 of audio item 1000 might at some point fall in a segment that is marked red. In this case, this interval is rendered and the results are appended to the rendered file 1005. From 1220, the process transition to 1230, which will be described below.

When the process determines (at 1215) that the selected audio item does not have a previously specified render file, the process renders (at 1225) the portion of the selected audio item that falls into the selected segment and stores this render result in a new render file for the audio item. From 1225, the process transitions to 1230.

At 1230, the process determines whether in the selected segment all audio items with filter and SRC operations have been examined. If not, the process transitions to 1210 to select an unexamined audio item and repeat the subsequent operation, which were described above. Otherwise, the process determines (at 1235) whether it has examined all the segments that were marked red by the process 1100. If not, the process selects (at 1240) an unexamined segment that has been designated as red, and then returns to 1210 to perform the above-described operations for this new segment. When the process determines (at 1235) that it has examined all the red segments, it ends.

Item level rendering has numerous advantages. First, pre-processing of audio items makes more of the resources available for processing more tracks with more effects and more power for video processing. Second, item level rendering does not require the application to re-render all audio items due to a change of filter or SRC parameters for one audio unit. In such a situation, only the affected audio unit has to be re-rendered. Third, item level rendering does not need to be repeated even when the audio items are moved.

Figure 13:
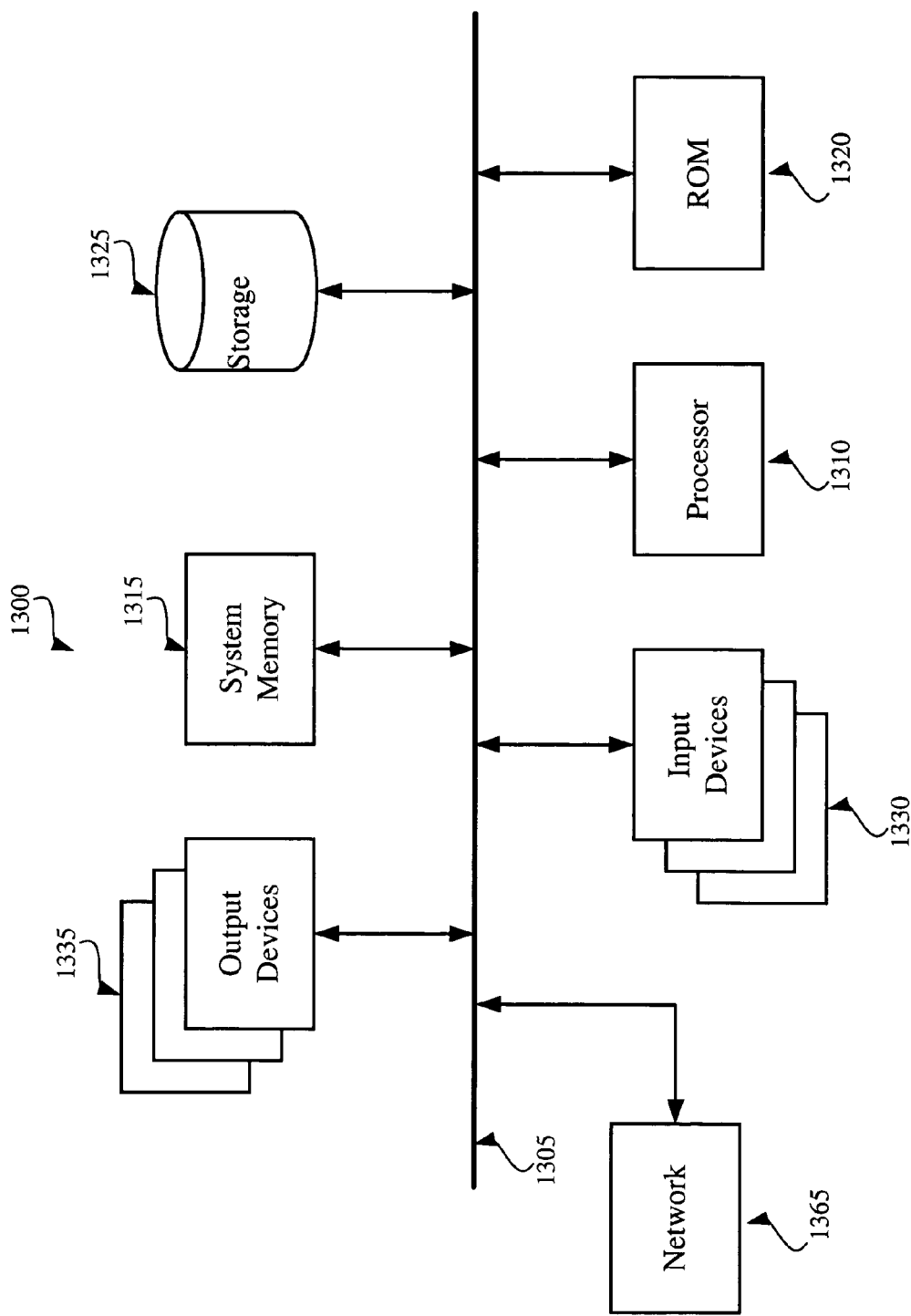
FIG. 13 conceptually illustrates a computer system used in conjunction with the invention.

FIG. 13 presents a computer system with which one embodiment of the invention is implemented. Computer system 1300 includes a bus 1305, a processor 1310, a system memory 1315, a read-only memory 1320, a permanent storage device 1325, input devices 1330, and output devices 1335. The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325.

From these various memory units, the processor 1310 retrieves instructions to execute and data to process in order to execute the processes of the invention. The read-only-memory (ROM) 1320 stores static data and instructions that are needed by the processor 1310 and other modules of the computer system.

The permanent storage device 1325, on the other hand, is read-and-write memory device. This device is a non-volatile memory unit that stores instruction and data even when the computer system 1300 is off. Some embodiments of the invention use a mass-storage device (such as a magnetic or optical disk and its corresponding disk drive) as the permanent storage device 1325.

Other embodiments use a removable storage device (such as a floppy disk or zip® disk, and its corresponding disk drive) as the permanent storage device. Like the permanent storage device 1325, the system memory 1315 is a read-and-write memory device. However, unlike storage device 1325, the system memory is a volatile read-and-write memory, such as a random access memory. The system memory stores some of the instructions and data that the processor needs at runtime. In some embodiments, the invention's processes are stored in the system memory 1315, the permanent storage device 1325, and/or the read-only memory 1320.

The bus 1305 also connects to the input and output devices 1330 and 1335. The input devices enable the user to communicate information and select commands to the computer system. The input devices 1330 include alphanumeric keyboards and cursor-controllers. The output devices 1335 display images generated by the computer system. For instance, these devices display IC design layouts. The output devices include printers and display devices, such as cathode ray tubes (CRT) or liquid crystal displays (LCD).

Finally, as shown in FIG. 13, bus 1305 also couples computer 1300 to a network 1365 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1300 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. The embodiments described above account for the video clips in a segment in assessing the cost of a segment. However, some embodiments might only cost audio items in a segment. Some of these embodiments account for the video clips by allocating less computational resources (i.e., specifying a smaller computational power) for processing audio data. Thus, one of ordinary skill in the art would understand that the invention is not to be limited by the foregoing illustrative details, but rather is to be defined by the appended claims.

I claim:

1. For a computer system, a method of processing audio data in creating a media presentation, wherein the media presentation includes several audio streams, the method comprising:
   a) processing a section of a first audio stream, wherein the processing of the section comprises applying a filter operation to the section;
   b) storing the processed section of the first audio stream;
   c) processing a section of a second audio stream independently of the first audio stream, wherein the second audio stream overlaps with the first audio stream; and
   d) storing the processed section of the second audio stream independently of the processed first audio stream.

2. The method of claim 1 further comprising processing all the audio data after the processing operations, wherein processing includes:
   processing a third audio stream by retrieving unprocessed data for the third audio stream;
   further processing the first and second audio streams by retrieving data produced by the initial processing of the first and second audio data.

3. The method of claim 2, wherein the further processing of the first and second audio streams includes performing mixing operations on the first and second audio streams.

4. The method of claim 2,
   wherein the initial processing of the first and second audio streams stores the processed first stream in a first render file and the processed second stream in a second render file, wherein before processing, the first, second, and third audio streams are in first, second, and third source files, wherein retrieving data for the third audio includes retrieving the data from the third source file, wherein retrieving data for the first and second audio files during the subsequent processing comprises retrieving data from the first and second render files.

5. The method of claim 1, wherein applying the filter operation comprises applying an effect to the first audio stream section.

6. The method of claim 5, wherein the processing of the first audio stream section further comprises performing a sample rate conversion on the first audio stream section.

7. The method of claim 1, wherein the processing of the second audio stream section comprises performing a sample rate conversion on the second audio stream section.

8. The method of claim 1 further comprising creating the presentation by mixing overlapping sections of the first and second audio streams.

9. The method of claim 8,
   wherein if an overlapping section specifies the stored processed section of the first audio stream, mixing the stored processed section of the first audio stream with an overlapping section of the second audio stream; and
   wherein if an overlapping section specifies the stored processed section of the second audio stream, mixing the stored processed section of the second audio stream with an overlapping section of the first audio stream.

10. The method of claim 8 further comprising, before mixing the overlapping sections, modifying said filter operation for the section of the first audio stream, reprocessing the section of the first audio stream using said modified filter operation, and storing the reprocessed section.

11. The method of claim 1, wherein the section of the first audio stream specifies an interval within the first audio stream that is less than the entirety of the first audio stream.

12. The method of claim 1, wherein the section of the first audio stream specifies the entirety of the first audio stream.

13. A method comprising:
   a) identifying a particular processing power of the computer system;
   b) processing a section of a first audio stream;
   c) storing the processed section of the first audio stream; and
   d) processing a section of a second audio stream independently of the first audio stream wherein the second audio stream overlaps with the first audio stream.

14. The method of claim 13 further comprising:
   before processing the sections of the first and second audio streams, identifying at least one of the sections as a portion of one of the audio streams that requires more than the available processing power of the computer system.

15. The method of claim 8, wherein identifying the at least one section that requires more than the available processing power of the computer system comprises:
   identifying at least one modified segment within the identified sections of the first and second audio streams; and
   identifying a cost for each segment within the identified sections.

16. The method of claim 15 further comprising:
   determining whether a sum of the costs for each segment within the identified sections is greater than a threshold value; and
   generating a plurality of render files for the several audio streams within the segment when the sum of the costs is greater than the threshold value.

17. The method of claim 16, the threshold value comprising a specified value in terms of an audio processing parameter.

18. The method of claim 16, the threshold value comprising a value calculated from the hardware resources of a computer system.

19. The method of claim 13, wherein identifying the particular processing power of the computer system comprises calculating a value based on the hardware resources of the computer system.

20. The method of claim 13, wherein identifying the particular processing power of the computer system comprises retrieving a user-specified parameter that indicates the amount of processing power.

21. A method comprising:
   a) processing a section of a first audio stream;
   b) storing the processed section of the first audio stream; and
   c) processing a section of a second audio stream independently of the first audio stream, wherein the second audio stream overlaps with the first audio stream; and
   d) moving the section of the first audio stream with respect to the section of the second audio stream, without having to discard the processing of the section of the first audio stream.

22. A computer readable medium that stores a computer program for processing audio data to create a media presentation, wherein the media presentation includes several audio streams, the computer program comprising sets of instructions for:
   a) processing a section of a first audio stream, wherein the processing of the section comprises a set of instructions for applying a filter operation to the section;
   b) storing the processed section of the first audio stream;
   c) processing a section of a second audio stream independently of the first audio stream, wherein the second audio stream overlaps with the first audio stream; and
   d) storing the processed section of the second audio stream independently of the processed first audio stream.

23. The computer readable medium of claim 22, wherein the set of instructions for applying the filter operation comprises a set of instructions for applying an effect to the first audio stream section.

24. The computer readable medium of claim 23, wherein the set of instructions for processing of the first audio stream section further comprises a set of instructions for performing a sample rate conversion on the first audio stream section.

25. The computer readable medium of claim 22, wherein the set of instructions for processing of the second audio stream section comprises a set of instructions for performing a sample rate conversion on the second audio stream section.

26. A computer readable medium that stores a computer program for creating a media presentation, the computer program comprising sets of instructions for:
   a) identifying a particular processing power of the computer system;
   b) processing a section of a first audio stream;
   c) storing the processed section of the first audio stream; and
   d) processing a section of a second audio stream independently of the first audio stream, wherein the second audio stream overlaps with the first audio stream.

27. A graphical user interface ("GUI") of a computer system, the GUI comprising:
   a user interface first item for specifying at least one operation to perform on a media item stored on the computer system; and
   a displayed second item associated with the media item, said displayed second item having a first appearance when the computer system has not pre-processed the at least one operation and said displayed second item having a second appearance when the computer system has pre-processed the at least one operation.

28. The GUI of claim 27, the media item comprising an audio item.

29. The GUI of claim 27, the media item comprising a video item.

30. The GUI of claim 27, the displayed second item having a third appearance when the at least one operation specifies a filter operation to apply to the media item.

31. The GUI of claim 27, the displayed second item having a third appearance when the at least one operation specifies a sample rate conversion operation to apply to the media item.

32. The GUI of claim 27, wherein said operation is performed on a portion of the media item, wherein said second appearance identifies said portion.

33. A graphical user interface ("GUI") of a computer system, the GUI comprising:
   a displayed first item with a first appearance for a media item stored on the computer system;
   a user interface second item for selecting an operation to perform on the media item;
   wherein the displayed first item changes to a second appearance after the selection of the operation to perform on the media item.

34. The GUI of claim 33, wherein the second appearance is only indicative of the selection of an operation to perform on the media item.

35. The GUI of claim 34 comprising a representation for the media item in the GUI, wherein the displayed first item spans the representation.

36. The GUI of claim 35, wherein the representation and the displayed first item are defined along a timeline.

37. The GUI of claim 33, wherein the displayed first item changes to the second appearance because a determination is made after the user interface second item selects the operation that the operation exceeds a particular processing power of the computer system.

38. The GUI of claim 37, the particular processing power of the computer system comprising a real-time processing power of the computer system.

39. The GUI of claim 38, the real-time processing power of the computer system comprising calculating a value based on the hardware resources of the computer system.

40. A computer readable medium that stores a computer program for creating a media presentation, the computer program comprising sets of instructions for:
   a) providing a user interface representation of a media item;
   b) receiving processing operations for the media item;
   c) identifying a section of the media item that exceeds a particular threshold; and
   d) generating a visual display to identify said section from the remainder of the media item.

41. The computer readable medium of claim 40, wherein the set of instructions for generating the visual display to identify the section that exceeds the particular threshold comprises a set of instructions for identifying said section with a first color and identifying the remainder of the media item with a second color.

42. The computer readable medium of claim 40, wherein the particular threshold determines whether a section of the media item can be processed in real-time based on a particular real-time processing power of a computer system.

43. The computer readable medium of claim 40, wherein the user interface representation of the media item spans across a timeline and the visual representations also span the timeline.

44. A computer readable medium that stores a computer program for creating a media presentation, the computer program comprising sets of instructions for:
   a) providing a user interface representation of a media item that needs to be processed;
   b) processing a section of the media item, wherein said section is an interval within the media item that is less than the entirety of the media item; and
   c) generating a visual display to identify the processed section of the media item from the remainder of the media item.

45. The computer readable medium of claim 44, wherein the set of instructions for generating the visual display comprises a set of instructions for identifying the processed section with a first color and identifying the remainder of the media item with a second color.

46. The computer readable medium of claim 44, wherein the user interface representation of the media items spans across a timeline and the visual representations to identify the processed section also spans the timeline.

47. A computer readable medium that stores a computer program for creating a media presentation, the computer comprising sets of instructions for:
   a) processing a section of a first audio stream;
   b) storing the processed section of the first audio stream; and
   c) processing a section of a second audio stream independently of the first audio stream, wherein the second audio stream overlaps with the first audio stream; and
   d) moving the section of the first audio stream with respect to the section of the second audio stream, without having to discard the processing of the section of the first audio stream.

* * * * *